(12) United States Patent
Atwood

(10) Patent No.: US 6,467,359 B1
(45) Date of Patent: Oct. 22, 2002

(54) MASS AIR FLOW METER

(75) Inventor: Robert K. Atwood, Rochester, MI (US)

(73) Assignee: Best Products, Inc., Oak Park, MI (US)

( * ) Notice: Subject to any disclaimer, the term of this patent is extended or adjusted under 35 U.S.C. 154(b) by 0 days.

(21) Appl. No.: 09/563,034

(22) Filed: May 1, 2000

(51) Int. Cl.[7] .............................................. G01F 1/44
(52) U.S. Cl. .............................. 73/861.63; 73/861.52; 73/861.64
(58) Field of Search ...................... 73/861.65, 861.66, 73/861.63, 861.52, 861.64, 202

(56) References Cited

U.S. PATENT DOCUMENTS

| | | | |
|---|---|---|---|
| 1,107,600 A | * | 8/1914 | Fulweiler |
| 4,164,144 A | * | 8/1979 | Kaiser et al. ................. 73/213 |
| 4,366,704 A | * | 1/1983 | Sato et al. ..................... 73/118 |
| 5,048,327 A | * | 9/1991 | Atwood ..................... 73/118.2 |
| 5,099,686 A | * | 3/1992 | Kohler ......................... 73/182 |
| 5,127,173 A | * | 7/1992 | Thurston et al. .............. 73/202 |

* cited by examiner

*Primary Examiner*—Benjamin R. Fuller
*Assistant Examiner*—Corey D. Mack (57) ABSTRACT

Improvement in a mass air flow meter having a static pressure manifold disposed upstream from an air flow path for sample air and capable of accumulating a volume of air therein, the flow path constructed to receive an air flow transducer, the static pressure manifold having an inlet arrangement in communication with the kinematic main air flow traveling through the meter so as to be capable of sensing different static pressures thereof, the static pressure manifold having a single outlet serving as the sole inlet for the sample air to be measured by the air flow transducer, the static pressure of the air accumulated in the static pressure manifold being such that it functions as a resultant average of the different static pressures sensed at its inlet arrangement, the static pressure manifold providing substantial immunity for the meter in respect to turbulent air flow upstream therefrom.

7 Claims, 7 Drawing Sheets

FIG. 10 PRIOR ART METER

FIG. 11 'UNIVER' METER

MASS AIR FLOW METER

My invention relates to mass air flow meters of the type shown and described in my prior U.S. Pat. No. 5,048,327 issued Sep. 17, 1991 which I refer to as my "PRO-M-Dot" mass air flow meter.

One object of my present invention is to provide an improved mass air flow meter which is neutral or universal in respect to turbulent air flow caused by air flow devices immediately upstream from the meter such as elbows, remote air cleaners, superchargers, super-chargers with inter-coolers and other such upstream structure that contribute to turbulent air flow.

Another object of my invention is to provide a unique and advantageous venturi construction for a mass air flow meter.

BRIEF DESCRIPTION OF THE DRAWINGS

By way of a trade name for my new mass air flow meter, I prefer to designate same as the "UNIVER" mass air flow meter.

The foregoing objects of my invention and the advantages thereof will become apparent during the course of the following description, taken in conjunction with the accompanying drawings, in which.

DETAILED DESCRIPTION OF THE INVENTION

Referring to the drawings in greater detail and particularly to FIGS. 1–6, reference numeral 300 designates my "UNIVER" mass air flow meter which will be described as in use for internal combustion engines though same has wider uses. The mass air flow meter 300 has a main body 310, in cylindrical form in the instance, through which the main air flow travels on its way to the intake manifold of such an engine. One or both ends of the body 310 may be provided with flanges (not shown) for connecting to external ducting (not shown). The venturi for mass air flow meter 300 is provided by a venturi member 318 of shorter axial length and smaller diameter than that of the body 310. The venturi member 318 has two axially spaced apart maximum outside diameter (O.D.) portions 314 and 316 thereof forming respective mounting surfaces therefor. The O.D. portions 314 and 316 each have a diameter substantially equal to the inside diameter (I.D.) of the body 310 so that the venturi member 318 can be disposed inside of the body 310 and be made fast thereto by any suitable means known in the art. For example, the O.D. portions 314 and 316 can be made slightly larger in diameter than the I.D. of the body 310 so that the latter must be heated to expand it circumferentially in order to insert the venturi member 318 thereinto. The body 310 can then be cooled while the venturi member 318 is correctly positioned and held stationary inside thereof during such cooling to contract the body 310 circumferentially, whereby to bond it to the venturi member 318 by hoop strength.

Figure 1:
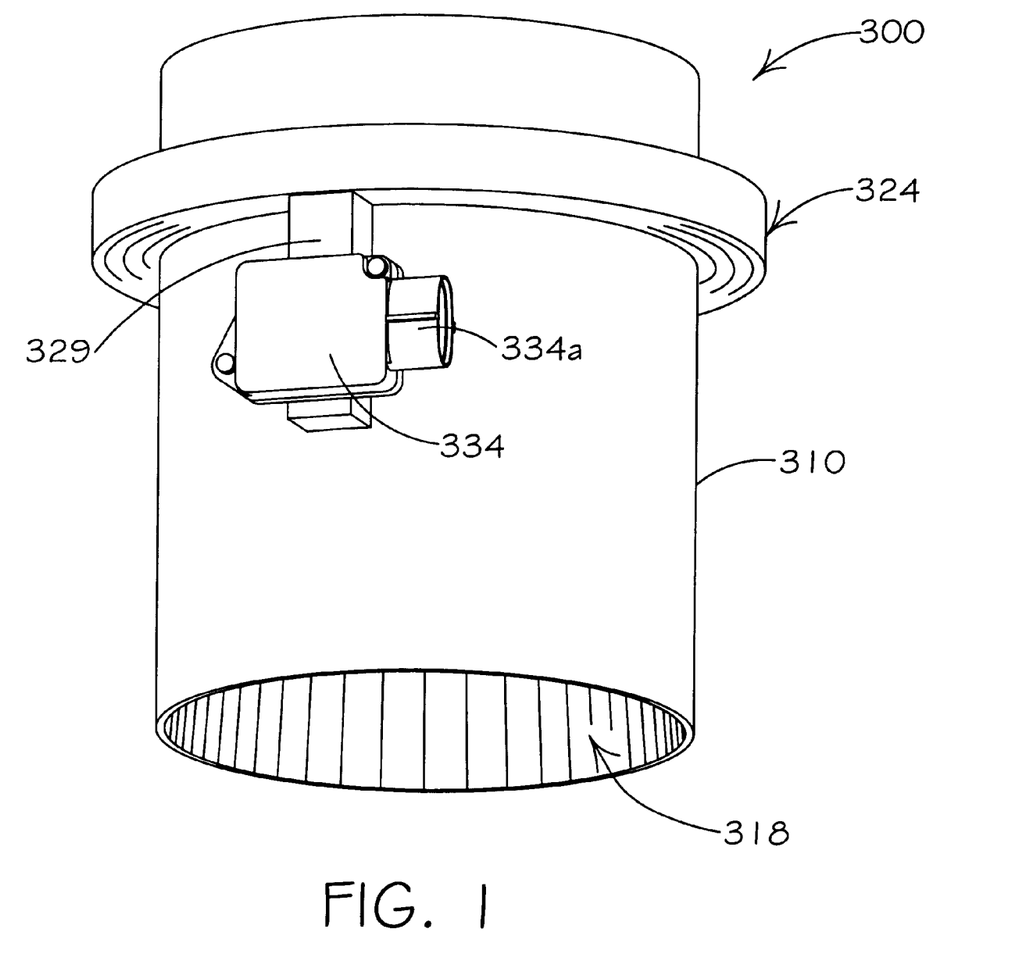
FIG. 1 is perspective view of my "UNIVER" mass air flow meter viewed so that the exterior housing for the electronic elements therefor can be seen.
Figure 2:
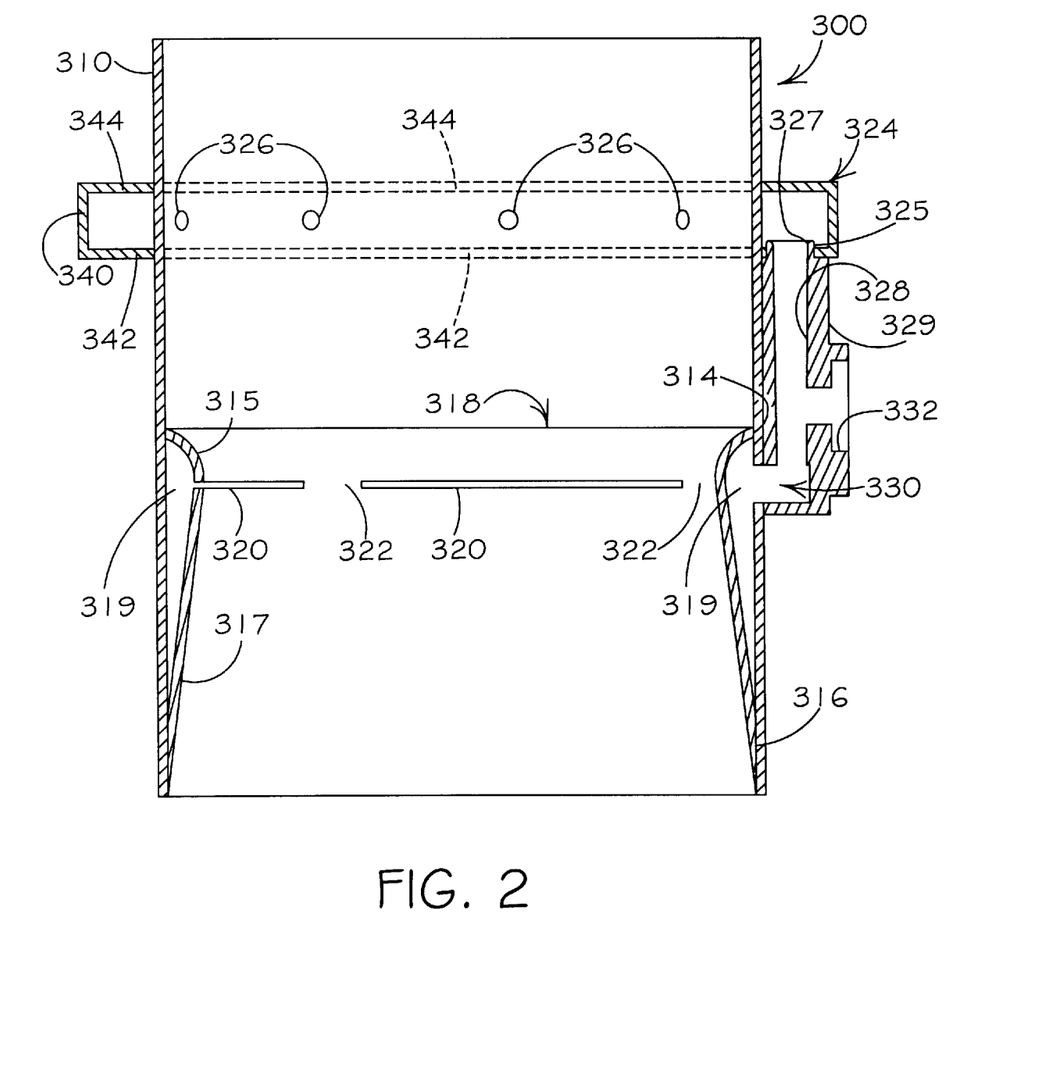
FIG. 2 is a vertical sectional view thereof.
Figure 3:
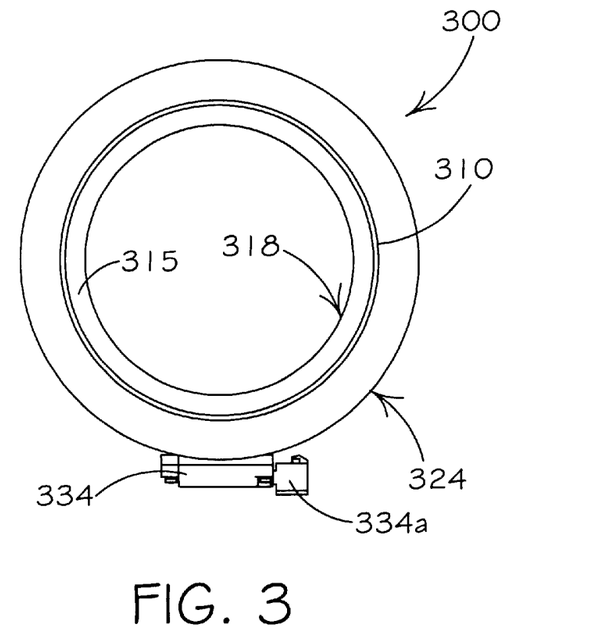
FIG. 3 is top plan view thereof.
Figure 4:
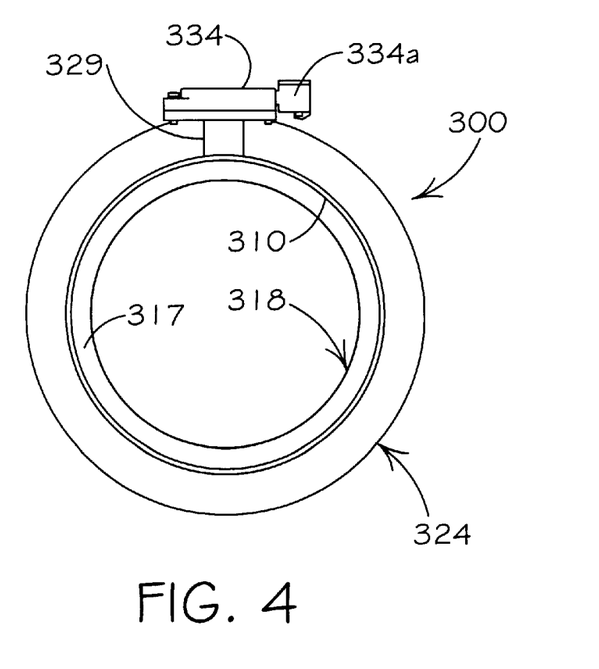
FIG. 4 is a bottom plan view thereof.
Figure 5:
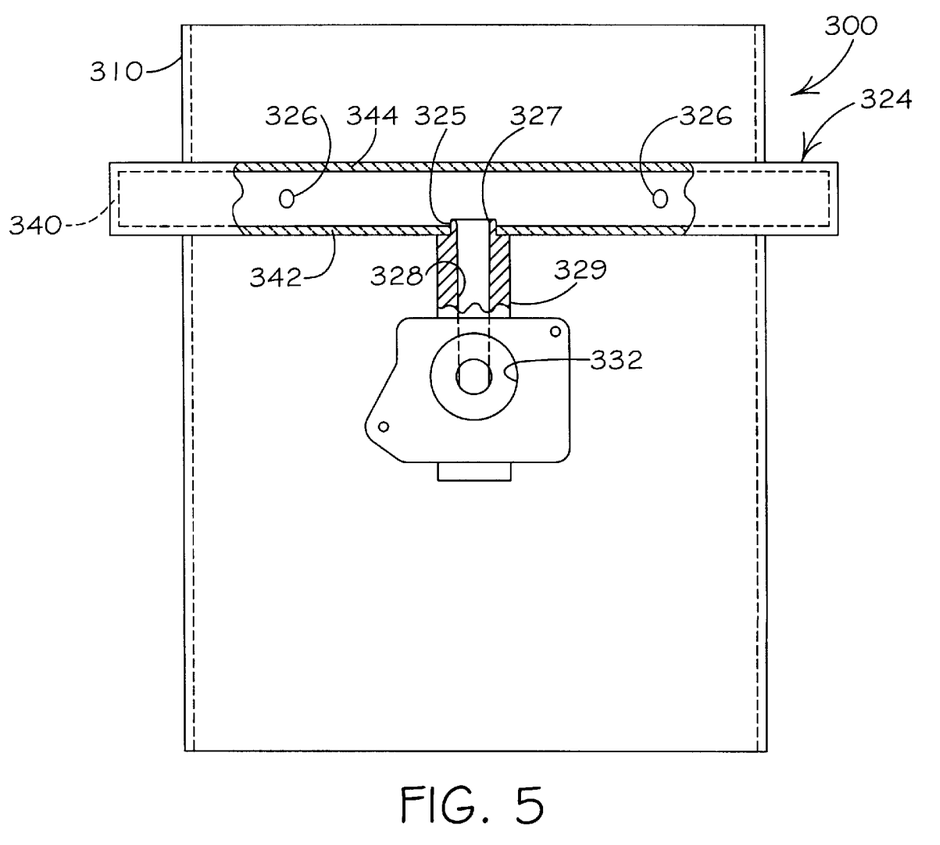
FIG. 5 is a front elevational view thereof with parts in section.
Figure 6:
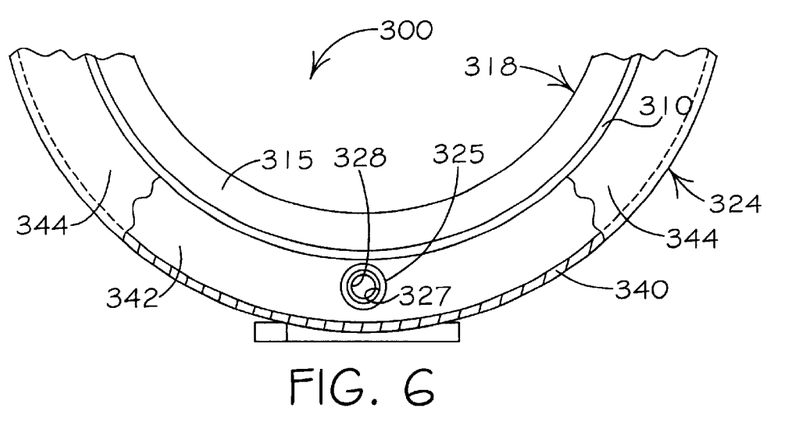
FIG. 6 is a top plan view of a portion of the structure of FIG. 5 with a portion of the structure thereof removed.

The venturi member 318 is necked-down as shown to form a minimum I.D. portion thereof where it is provided with flow restriction means in the form of equally circumferentially spaced apart slits 320 through the wall thickness thereof. In the instance, the through-slits 320 are 35 thousandths of an inch in axial length though these may vary from 20 to 50 thousandths of an inch depending upon the particular application. There are three such slits 320 of approximately 105 degrees in circumference each in the instance. Two of the three remaining wall portions of the venturi member 318 (each of which is 15 degrees in circumference) are shown at the throat of the venturi and indicated at 322.

The air-flow surface of the venturi member 318 is formed, as shown, into a convergent air foil 315 above the venturi throat (where said flow restriction means 320 are located) and into a divergent recovery cone therebelow. The non-air-flow surface of the venturi member 318 forms, with the I.D. wall of the body 310, an axially extending cavity 319 between its opposite ends 314 and 316 where these bear against the I.D. of the body 310, as shown and described above. Such annular cavity 319 serves as a collection chamber as will be mentioned below.

Upstream from the venturi 318, a static pressure manifold 324 is provided which has a sole outlet therefor serving as the sole inlet for the sample tube 328. In the instance, the manifold 324 is an annular chamber having, as an inside wall thereof, a portion of the body 310. The outside wall of the manifold 324 is designated 340, the bottom wall or floor thereof 342 and the top wall or roof thereof 344. The inlet for the manifold 324 is in the form of a plurality of circumferentially aligned equally spaced apart through-apertures 326 extending through the wall thickness of the body 310. The axes of the apertures 326 are perpendicular to the axis of the main body 310 in order to correctly sense the static pressure of the kinematic air flow traveling through the body 310 toward the venturi. In the instance, the apertures 326 are eight in number and, for the 8 inch nominal size meter shown, each is approximately ¼ inch in diameter. For a 3 inch nominal size meter, the apertures 326 would still be eight in number, but approximately ⅛ inch in diameter. The static pressure of the sample air flow path through the sample tube 328 is thus controlled by the static pressure of the air accumulated in the manifold 324 which, in turn, produces a resultant average of the plurality of individual static pressures sensed at the apertures 326 (of the kinematic air flow traveling through the body 310 toward the venturi 318). A dam 325 is provided at the inlet 327 to surround same which upstands from the floor 342 of the manifold 324, as shown, for damming that portion of the air mass which hugs said manifold floor 342 while moving into the inlet 327. Thus, the air entering the inlet 327 of the sample tube 328 is more axially directed and produces less noise in the signal output than without such damming. The top wall of the dam 325 is formed with a convergent taper, as shown, to assist moving the dammed air into the inlet 327 of the sample tube 328. The sample tube 328 is formed in an exterior mounting structure 329 which is fastened by well known means to the outside wall of the body 310 beneath the manifold 324, as shown. The sample tube 328 is provided with a taper, as shown, which decreases in diameter in the direction of the air flow therethrough. Slightly upstream from the exit end of the sample tube 328, the mounting structure 329 is counterbored, as at 332, to receive and hold therein two sensing elements (not shown), as is well known in the art. One is an air flow sensing element and the other an ambient temperature sensing element which are both housed in an electrically insulated holder 334 which also houses a prior art signal amplifier (not shown). Projecting laterally from the holder 334 is an electrical connector 334a for supplying electrical power to said elements and amplifier and for serving as an electrical connection for the signal out from said amplifier (to the engine process controller which meters fuel to the engine). The holder 334 is made fast to the mounting structure 329 externally thereof by well known means so that the sensing elements therein protrude through said counterbore 332 into the interior of the sample tube 328 to carry out their respective sensing functions, as is well known in the art. A transverse expansion chamber 330 is provided at the outlet of the sample tube 328 which is greater in cross-section than that of the largest cross-section of the sample tube 328 to allow for immediate expansion for the sample air flow exiting from the sample tube 328. Downstream from the expansion chamber 330 is the aforementioned annular collection chamber 319 surrounding the flow restriction means 320 which chamber 319 is of greater volume than that of the sample tube 328 and the expansion chamber 330 combined. The collecting chamber 319 accumulates the sample air flow transferred from the expansion chamber 330 and distributes it substantially equally to the plurality of flow restriction means 320.

Figure 7:
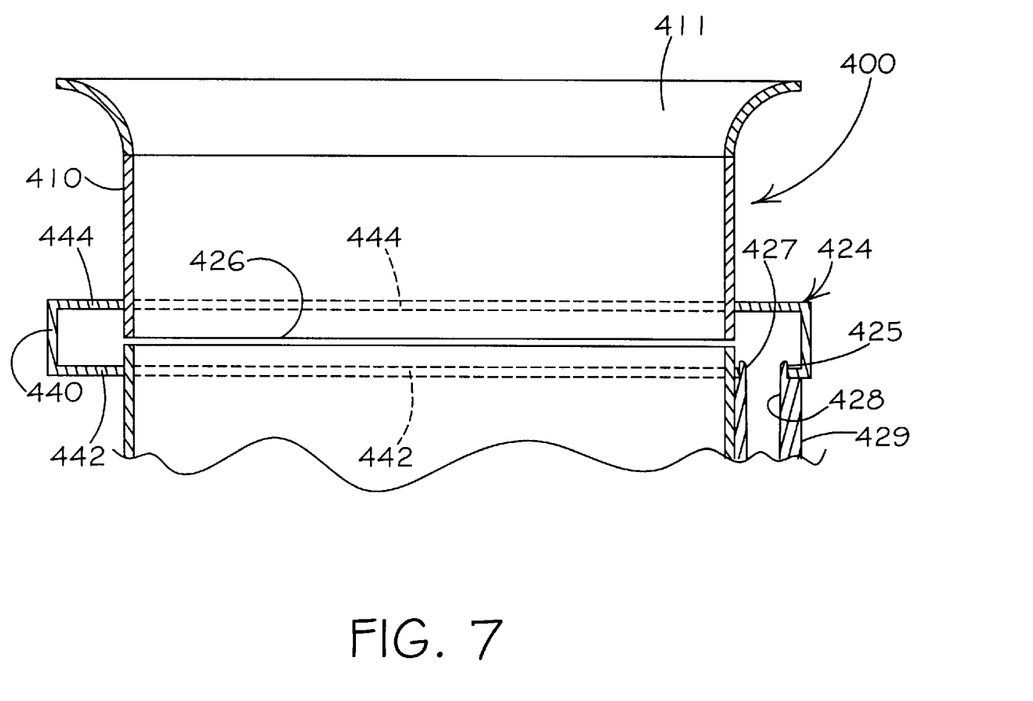
FIG. 7 is a fragmentary vertical sectional view similar to that of FIG. 2 of another embodiment of my invention.
Figures 8A, 8B:
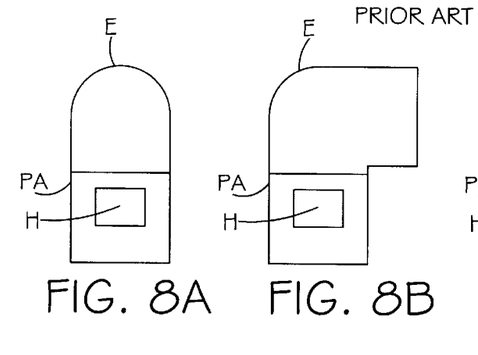
FIGS. 8A through 8D are respective schematic views of a prior art meter shown having an upstream elbow connected directly thereto in different orientations thereof.
Figures 8C, 8D:
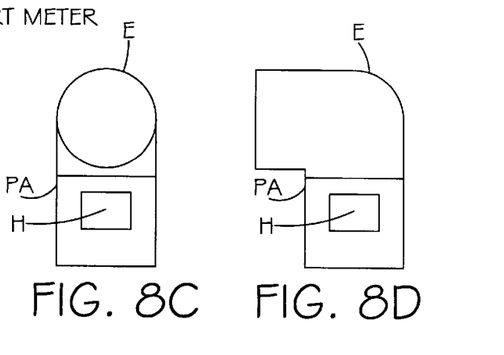

Referring now to FIG. 7, the embodiment of my "UNIVER" mass air flow meter shown therein is designated 400 which has a main hollow body 410. The venturi (not shown) for the mass air flow meter 400 is identical to the venturi 318 previously described. Upstream from such venturi 318 (not shown), the body 410 is provided with a static pressure manifold 424 having a sole outlet which serves as the sole inlet 427 for the sample tube 428. As in the prior embodiment, the manifold 424 is an annular chamber having as an inside wall thereof a portion of the body 410. The outside wall of the manifold 424 is designated 440, the bottom wall or floor thereof 442, and the top wall or roof thereof 444. The sole inlet for the manifold 424 is a 360 degree circumferential slit 426 through the wall thickness of the body 410 which divides the latter into two separate portions thereof. The axial length of the through-slit 426 can vary from approximately 50 thousandths of an inch to ¼ of an inch depending upon the size of the mass air flow meter 400. The larger the size of my UNIVER mass air flow meter, the smaller is the axial length of the through-slit 426. In the instance, for the 8 inch nominal size meter shown, the axial length of the through-slit 426 is 90 thousandths of an inch. For a 3 inch nominal size meter, the through-slit 426 is ⅛ of an inch in axial length. For the same reason as in the prior embodiment, the axis of the through-slit 426 is perpendicular to the axis of the body 310. It is essential that the portion of the body 410 above the through-slit 426 and the portion below have matching annular cross-sections and that they be aligned axially of each other (so that the two portions of the body 410 have no radial offset between them). The i static pressure of the sample air entering the sample tube 428 is thus controlled by the static pressure of the air accumulated in the manifold 424 which, in turn, produces a resultant average of the plurality of individual static pressures sensed through the slit 426 [of the kinematic air flow traveling toward the venturi 318 (not shown)]. As in the prior embodiment, a dam 425 having a convergently tapered top wall, as shown, is provided at the inlet 427 to surround same which dam 425 upstands from the floor 442 of the manifold 424 for damming that portion of the air mass which hugs said manifold floor 442 while moving into the inlet 427. The sample tube 428 is formed in a mounting structure 429 with a taper, as shown (decreasing diameter in the direction of the air flow therethrough), the same as for the sample tube 328 and mounting structure 329. As in the prior embodiment 300, a transverse expansion cavity (not shown) is provided at the outlet of the sample tube 428 to allow for expansion for the sample air flow exiting from the sample tube 328. Immediately downstream from the expansion chamber is a collecting chamber (not shown) provided by a venturi member (not shown) identical to the venturi member 318. In those uncommon instances where the mass air flow meter 400 is not connected into an air intake system, but is used with a free air inlet, same can be provided in the form of an inlet air horn 411 which attaches to the body 410 by well known means. The horn 411 is provided with a divergent air surface structure, as shown. The downstream cross section of the air horn 411 should match that of the upstream end of the body 410, as shown.

In operation of my UNIVER mass air flow meter 300, the air accumulated in the manifold 324 has a resultant static pressure, as mentioned, from averaging of the plurality of static pressures of the kinematic flow through the body 310 sensed at the apertures 326. Said manifold 324 feeds the inlet 327 of the sample tube 328. As is well known, the maximum vacuum is created at the throat of the venturi (where the flow restriction means 320 are located) to produce maximum draw of the air flowing through the sample tube 328. The sample air flow exiting from the sample tube 328 enters the expansion chamber 330 to insure no back pressure for such flow of sample air through the sample tube 328. The sample air flow exiting from the expansion chamber 330 enters the collecting chamber to likewise insure no back pressure for such sample air flow and to accumulate and distribute such sample air flow substantially equally to the flow restriction means 320.

Figure 9:
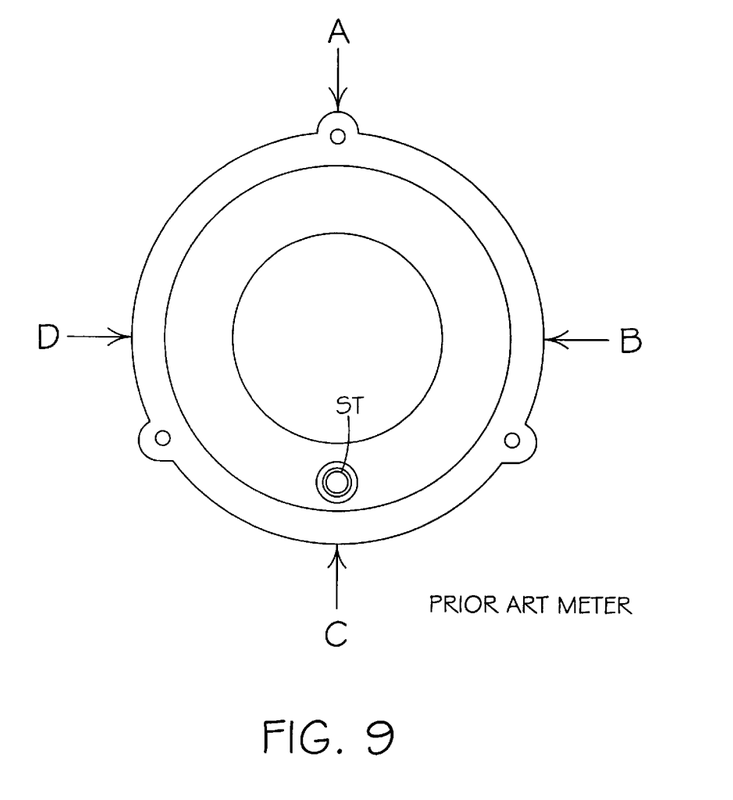
FIG. 9 is another schematic view of said prior art meter further illustrating such different orientations of such upstream elbow.

As mentioned, the major advantage of my UNIVER mass air flow meter is its immunity in respect to turbulent air flow caused by upstream elbows and the like. Virtually the same output for an elbow immediately in front of the meter is realized as with an ideal upstream inlet condition for the particular engine as discussed below. Reference is made to FIGS. 8–11 wherein FIGS. 8A through 8D are front elevation views of a typical prior art meter PA showing the electrically insulated holder H affixed to the front face thereof, as is usual. The prior art meter PA has affixed thereto an elbow E at four different orientations therefor as shown in FIGS. 8A through 8D, respectively, so that the inlet air flow for said meter PA enters same from four different directions (corresponding to 0, 90, 180 and 270 degrees) as illustrated in FIG. 9, namely, at the respective locations A, B C and D therein. As is well known in the art, most such meters have their sample tubes affixed internally close by an I.D. wall of t h e main body of the mass air flow meter so as to be laterally offset from the center of the main flow path through the venturi, as shown in FIG. 9 for the prior art meter PA and for the sample tube therefor shown and indicated at ST. In the case of my UNIVER meter, the sample tube 328 is likewise laterally offset, but, as has been described and shown, is disposed externally of the main body 310 of the mass air flow meter 300 and so as to be fed with air exclusively from that which accumulates within the static pressure manifold 324. The sample tube 328, in such instance, receives a representative flow of the intake air flow which is both repeatable and reliable no matter that it is laterally offset. My UNIVER meter thus functions as though the air intake system is near an ideal upstream configuration for air flow devices irrespective of necessarily crowded conditions in engine compartments. To duplicate the function of my UNIVER meter, the upstream configuration would have to be near ideal conditions meaning that such flow is established by a long straight path (of at least ten times the diameter of the meter body). In such instance, the air flow takes on a centered parabolic flow pattern. In the case of prior art air flow meters, this near ideal condition can never be realized because most air intake systems need to closely couple elbows to the mass air flow meter inlet for connecting to other upstream devices within the engine compartment. An elbow immediately in front of the air meter is quite common though it represents a worst case scenario because it causes the inlet air to pack against the far side of the closely coupled elbow. In prior art meters this condition adversely affects their sensing accuracy so much so that it is necessary to separately calibrate the meter for that particular air intake system. The manufacturer has to carry separate part numbers for each air intake system that has to be calibrated, whereas with my UNIVER meter same is universal for all air intake systems. For the after market, where meters are replaced in ageing vehicles, the number of calibrations (and separate part numbers) required will greatly be reduced. In the case of my UNIVER mass air flow meter, the aforementioned near ideal condition can be realized in actual effect in spite of any and all turbulent air flow caused by most air intake systems that need to closely couple elbows thereto (to my UNIVER mass air flow meter inlet) for connecting to other upstream devices within the engine compartment. This is due to the function of the static pressure manifold 324 which accumulates therein the air source for the sample air tube 328 to insure the aforementioned repeatable and reliable represenative sample air flow irrespective of the turbulence of the actually encountered upstream air flow profiles.

Figure 10:
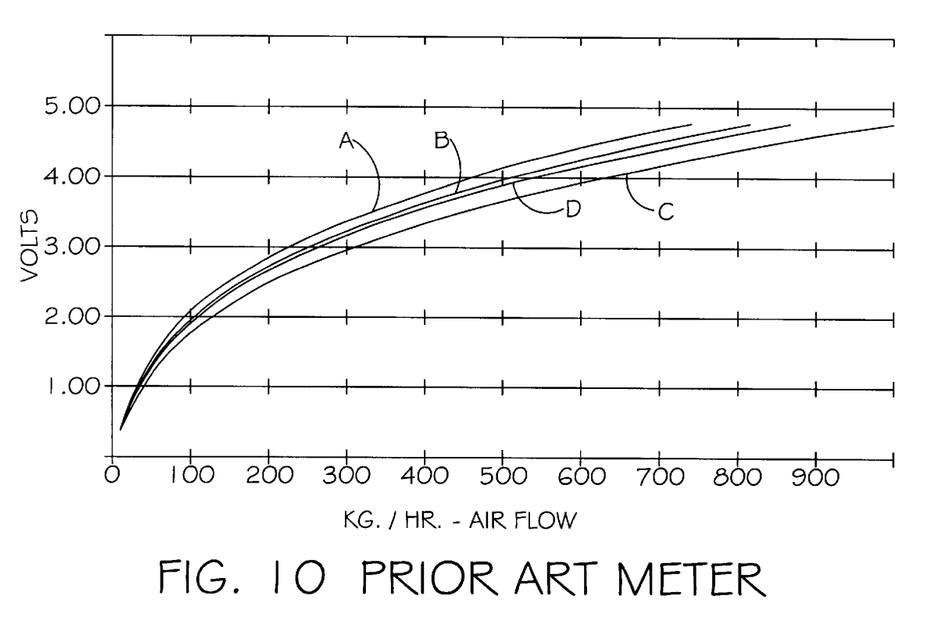
FIG. 10 is a graph showing the effect upon such prior art mass air flow meter at the different orientations of said elbow.

FIG. 10 illustrates flow curves (A through D, respectively) of the prior art meter PA in the four different positions of the elbow E (positions A through D of FIG. 9). The four curves A through D represent voltage response outputs (at the voltage amplifier) versus absolute air flow in kilograms per hour (National Bureau of Standards specifications for certified mass air flow). The curves A through D are different from each other over the whole range of flow of the meter PA. In most cases, this difference is as much as 40% in output voltage values, but can be as much as 60%.

Figure 11:
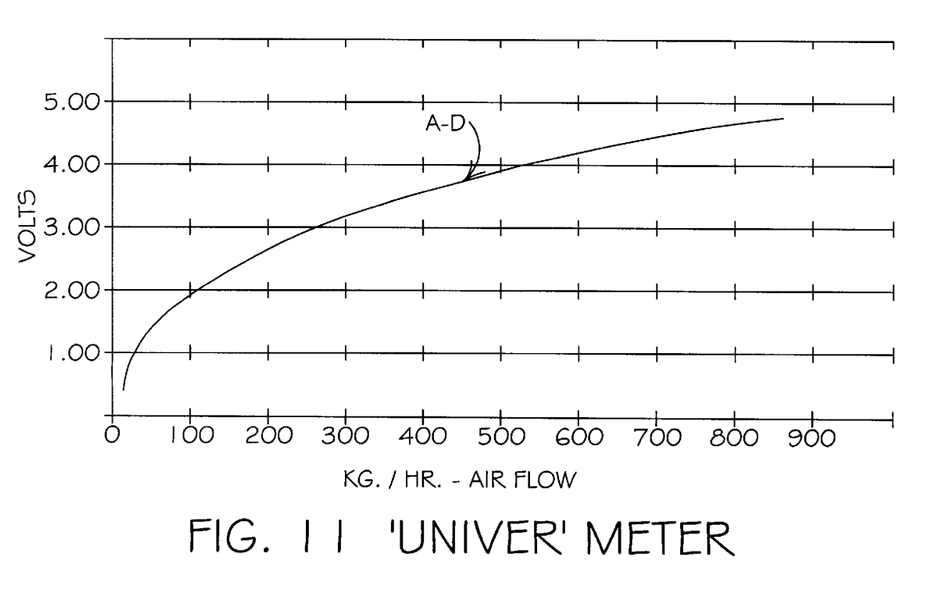
FIG. 11 is a similar graph showing the effect upon my "UNIVER" mass air flow meter of a directly connected elbow at the same orientations thereof.

FIG. 11 shows the results with my "UNIVER" meter 300 which, for each of the four orientations of the same elbow E (locations A through D in FIG. 9), yields but a single curve (labeled A–D) wherein the voltage response outputs are substantially the same (i.e., differing from each other by no more than 3% to 5%) over the whole range thereof (of the meter 300). Comparable results were realized with the meter 400.

It will thus be seen that there has been provided by my invention improvements in a mass air flow meter in which the objects hereinabove set forth, together with many thoroughly practical advantages, have been successfully achieved. While preferred embodiments of my invention have been shown and described, it is to be understood that variations and changes may be resorted to without departing from the spirit of my invention as defined by the appended claims.

What I claim is:

1. Improvement in a mass air flow meter having an elongated hollow body having a venturi therein, a sample tube associated with said body for receiving a flow of sample air therethrough, the entire air source for the meter being split into a main flow path through the venturi and into a sample path through the sample tube, the sample tube constructed to receive therein near the downstream end thereof an air flow transducer, a collection chamber for accumulating the sample air flow exiting from the sample tube, flow restriction means at the throat of the venturi serving as the outlet of said collection chamber where the sample air is recombined with the main air flow through the venturi, said improvement comprising a static pressure manifold disposed upstream from the sample tube and capable of accumulating a volume of air therein, said static pressure manifold having inlet means therefor in communication with the kinematic main air flow traveling through said hollow body toward said venturi, said inlet means being disposed in respect to the path of travel of such main air flow so as to be capable of sensing different static pressures thereof, said static pressure manifold having a single outlet therefor serving as the sole inlet for the sample path of air entering the sample tube to be measured by said air flow transducer, the static pressure of the air accumulated in the static pressure manifold being such that it functions as a resultant average of the different static pressures sensed at the inlet means thereof, said static pressure manifold providing for the sample air being measured in said sample tube substantial immunity in respect to turbulent air flow upstream from the meter.

2. Improvement in a mass air flow meter as claimed in claim 1 in which the static pressure manifold is an annular chamber disposed outboard of said hollow body, a portion of the hollow body serving as an inside wall of the static pressure manifold and said inlet means extending through the wall thickness of said wall portion of the hollow body.

3. Improvement in a mass air flow meter as claimed in claim 2 in which said inlet means comprises circumferentially aligned spaced apart apertures through the wall thickness of said wall portion of the hollow body, the axes of said apertures being perpendicular to the axis of said hollow body.

4. Improvement in a mass air flow meter as claimed in claim 2 in which said inlet means comprises a circumferential slit through the wall thickness of said wall portion of said hollow body, the plane of said through-slit being perpendicular to the axis of said hollow body.

5. Improvement in a mass air flow meter having an elongated hollow body having a venturi therein, means providing a flow path for receiving a flow of air therethrough, there being for the meter a main flow of fluid through the venturi and a separate flow of air through said flow path, said flow path being constructed to receive therein near the downstream end thereof an air flow transducer, a collection chamber for accumulating the air flow exiting from said flow path, flow restriction means at the throat of the venturi serving as the outlet of said collection chamber where said separate air flow is combined with the main flow of fluid through the venturi, said improvement comprising a static pressure manifold disposed upstream from said flow path and capable of accumulating a volume of air therein, said static pressure manifold having inlet means therefor in communication with a kinematic flow of air so as to be capable of sensing different static pressures thereof, said static pressure manifold having a single outlet therefor serving as the sole inlet for the separate flow of air entering said flow path to be measured by said air flow transducer, the static pressure of the air accumulated in the static pressure manifold being such that it functions as a resultant average of the different static pressures sensed at the inlet means thereof, said static pressure manifold providing for the air being measured in said flow path substantial immunity in resect to turbulence in the kinematic flow at the inlet means of said static pressure manifold.

6. Improvement in a mass air flow meter as claimed in claim 2 in which the sample tube is disposed outboard of said hollow body adjacent the static pressure manifold.

7. Improvement in a mass air flow meter having an elongated hollow body having a venturi therein, means providing a flow path for receiving a flow of sample air therethrough, the entire air source for the meter being split into a main flow path through the venturi and into a sample path through said flow path, said flow path being constructed to receive therein near the downstream end thereof an air flow transducer, a collection chamber for accumulating the sample air flow exiting from said flow path, flow restriction means at the throat of the venturi serving as the outlet of said collection chamber where the sample air is recombined with the main air flow through the venturi, said improvement comprising a static pressure manifold disposed upstream from said flow path and capable of accumulating a volume of air therein, said static pressure manifold having inlet means therefor in communication with the kinematic main air flow traveling through said hollow body toward said venturi, said inlet means being disposed in respect to the path of travel of such main air flow so as to be capable of sensing different static pressures thereof, said static pressure manifold having a single outlet therefor serving as the sole inlet for the sample path of air entering said flow path to be measured by said air flow transducer, the static pressure of the air accumulated in the static pressure manifold being such that it functions as a resultant average of the different static pressures sensed at the inlet means thereof, said static pressure manifold providing for the sample air being measured in said flow path substantial immunity in respect to turbulent air flow upstream from the meter.

* * * * *

UNITED STATES PATENT AND TRADEMARK OFFICE
CERTIFICATE OF CORRECTION

PATENT NO.     : 6,467,359 B1
DATED          : October 22, 2002
INVENTOR(S)    : Atwood It is certified that error appears in the above-identified patent and that said Letters Patent is hereby corrected as shown below:

<u>Column 4,</u>
Line 3, between "The" and "static", delete "i".

Signed and Sealed this

Twenty-eighth Day of October, 2003

JAMES E. ROGAN
*Director of the United States Patent and Trademark Office*